United States Patent
Bartels et al.

(10) Patent No.: US 8,086,912 B2
(45) Date of Patent: Dec. 27, 2011

(54) MONITORING AND ROOT CAUSE ANALYSIS OF TEMPORARY PROCESS WAIT SITUATIONS

(75) Inventors: Christian Bartels, Dossenheim (DE); Eric Kass, Mannheim (DE)

(73) Assignee: International Business Machines Corporation, Armonk, NY (US)

(*) Notice: Subject to any disclaimer, the term of this patent is extended or adjusted under 35 U.S.C. 154(b) by 301 days.

(21) Appl. No.: 12/417,143

(22) Filed: Apr. 2, 2009

(65) Prior Publication Data
US 2010/0257408 A1 Oct. 7, 2010

(51) Int. Cl.
*G06F 11/00* (2006.01)
(52) U.S. Cl. .......................................................... 714/55
(58) Field of Classification Search .................. 714/55
See application file for complete search history.

(56) References Cited

U.S. PATENT DOCUMENTS

| | | | |
|---|---|---|---|
| 6,785,803 B1* | 8/2004 | Merchant et al. | 712/219 |
| 7,155,722 B1* | 12/2006 | Hilla et al. | 718/105 |
| 2005/0132030 A1* | 6/2005 | Hopen et al. | 709/223 |
| 2005/0185646 A1* | 8/2005 | Karino et al. | 370/389 |
| 2005/0262246 A1* | 11/2005 | Menon et al. | 709/226 |
| 2006/0059166 A1* | 3/2006 | Sieffert et al. | 707/10 |
| 2007/0271547 A1* | 11/2007 | Gulko et al. | 717/106 |
| 2009/0125510 A1* | 5/2009 | Graham et al. | 707/5 |
| 2009/0313623 A1* | 12/2009 | Coskun et al. | 718/100 |
| 2010/0049922 A1* | 2/2010 | Aronovich et al. | 711/147 |
| 2010/0050161 A1* | 2/2010 | Nir-Buchbinder et al. | 717/126 |
| 2010/0057916 A1* | 3/2010 | Sieffert et al. | 709/226 |

* cited by examiner

*Primary Examiner* — Bryce Bonzo
(74) *Attorney, Agent, or Firm* — Cantor Colburn LLP; Randall Bluestone

(57) ABSTRACT

A computing system is provided and includes first computing resources representing a fraction of total computing resources, second computing resources representing at least a partial remainder of the total computing resources except for the first computing resources, and a memory unit. The memory unit includes a computer-readable medium having computer-readable executable instructions stored thereon that are accessible to at least the second computing resources. When executed, the executable instructions cause the second computing resources to monitor a process running on the first computing resources in accordance with pre-selected parameters, to determine that a potential lock or wait situation that impedes the process is in effect from a result of the monitoring and to execute an action in response to the potential lock or wait situation.

20 Claims, 2 Drawing Sheets

MONITORING AND ROOT CAUSE ANALYSIS OF TEMPORARY PROCESS WAIT SITUATIONS

BACKGROUND

Figure 1:
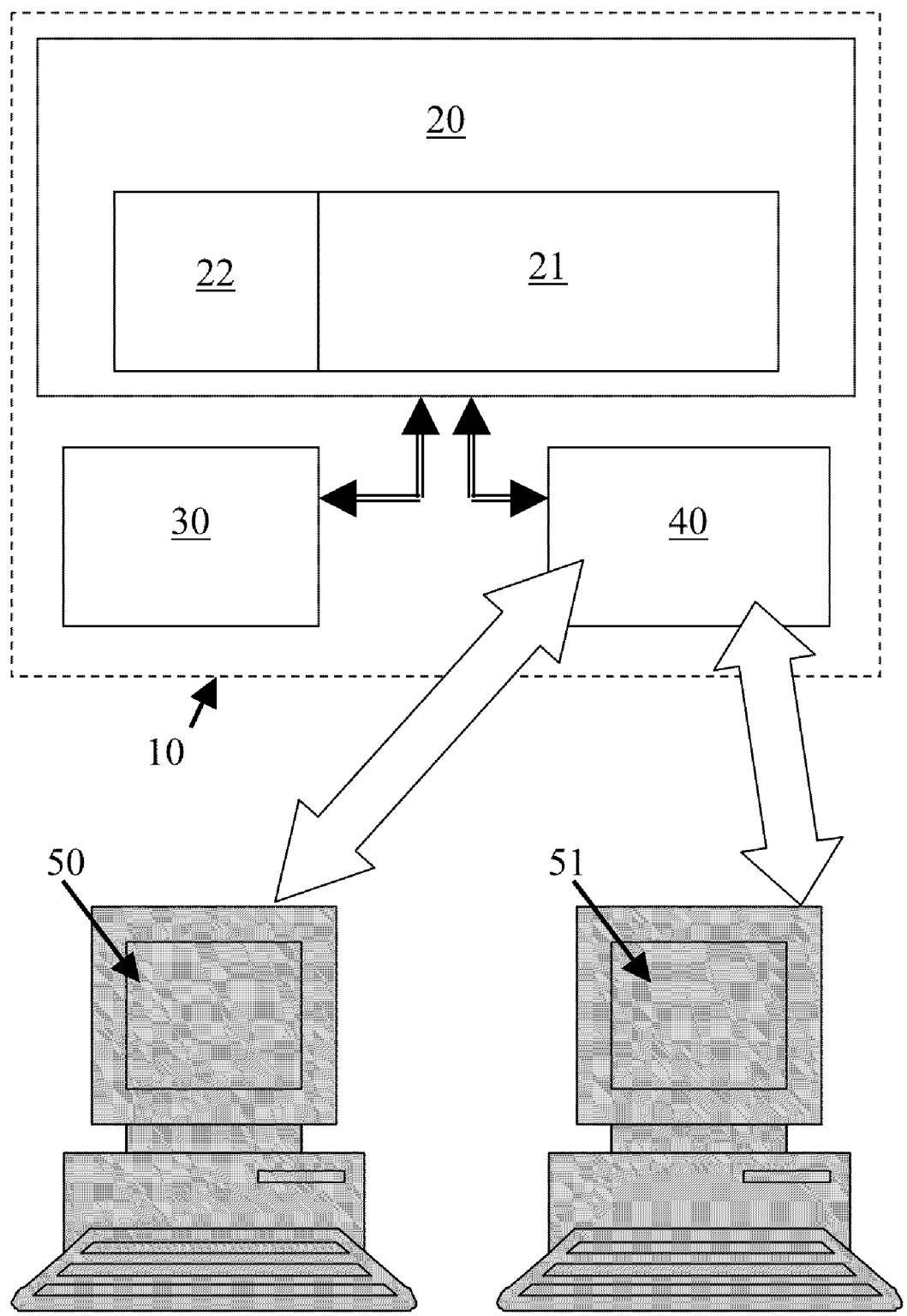

Aspects of the present invention are directed to methods and tools to monitor and perform root cause analysis of temporary process wait situations.

Recently, it has been seen that computing systems are subject to intermittent performance degradations or wait situations in productive environments that have root causes that cannot be easily explained. For example, end users connected to a particular computing system may report that an application screen freezes for up to five minutes, but that this freeze happens only once or twice per week. Typically, in such a case, the system administrator would check system logs for any unusual entries, he/she may look at scheduled batch jobs and he/she may try mapping the events to a specific job. Alternatively, the system administrator may look at performance history data to see if the degradation can be linked to unusual high overall system load. Unfortunately, there may not be any obvious indications as to why the freeze occurs.

Analysis of problems similar to the one described above is even more difficult in complex applications that involve multiple servers and processes to process a single user request. Thus, trace tools have been provided to identify application slowdown instances based on "soft" conditions and to collect appropriate diagnostic material automatically.

While there are many trace tools available to analyze performance problems, their use may be impractical if the problems happen relatively rarely and only for short time periods. Trace tools collect a significant amount of data and add some overhead to the overall system utilization, so users may not be able to afford to activate traces over an extended time period. If, on the other hand, the trace tools are configured to operate in a wrap mode, operators may not be able to react quickly enough and stop the traces before the important data is overwritten by newer data.

Besides trace tools, users can use watchdog tools. Watchdog tools can perform diagnostic tasks in case of specific events and conditions. Examples for events are an abnormal end of a task or process, an error condition, such as I/O error, machine check or application error message, an execution of specific instructions, such as branch instructions and read or write access to specific storage locations. Examples for conditions are a process, task or job name, a program, module, or entry point name and contents of specific storage locations. If the problems cannot be linked to specific events and the responsible component in the application or system code is not known, however, watchdog tools cannot be used.

SUMMARY

In accordance with an aspect of the invention, a computing system is provided and includes first computing resources representing a fraction of total computing resources, second computing resources representing at least a partial remainder of the total computing resources except for the first computing resources, and a memory unit. The memory unit includes a computer-readable medium having computer-readable executable instructions stored thereon that are accessible to at least the second computing resources. When executed, the executable instructions cause the second computing resources to monitor a process running on the first computing resources in accordance with pre-selected parameters, to determine that a potential lock or wait situation that impedes the process is in effect from a result of the monitoring and to execute an action in response to the potential lock or wait situation.

In accordance with an aspect of the invention, a computer-readable medium for use in a computing system, including a processing unit, is provided. The computer-readable medium has computer-readable executable instructions stored thereon, which, when executed cause the processing unit to monitor a running process in accordance with pre-selected parameters, to determine that a potential lock or wait situation that impedes the process is in effect from a result of the monitoring and to execute an action in response to the potential lock or wait situation.

In accordance with an aspect of the invention, a method of operating a computing system, including first and second computing resources representing respective fractions of total computing resources, is provided and includes starting a monitoring of a process running on the first computing resources by the second computing resources in accordance with pre-selected parameters, confirming that a valid time window for the monitoring is available, in an event the valid time window for the monitoring is available, detecting a potential lock or wait situation that impedes the running of the process from a result of the monitoring, and executing an action in response to the potential lock or wait situation.

BRIEF DESCRIPTIONS OF THE SEVERAL VIEWS OF THE DRAWINGS

Figure 2:
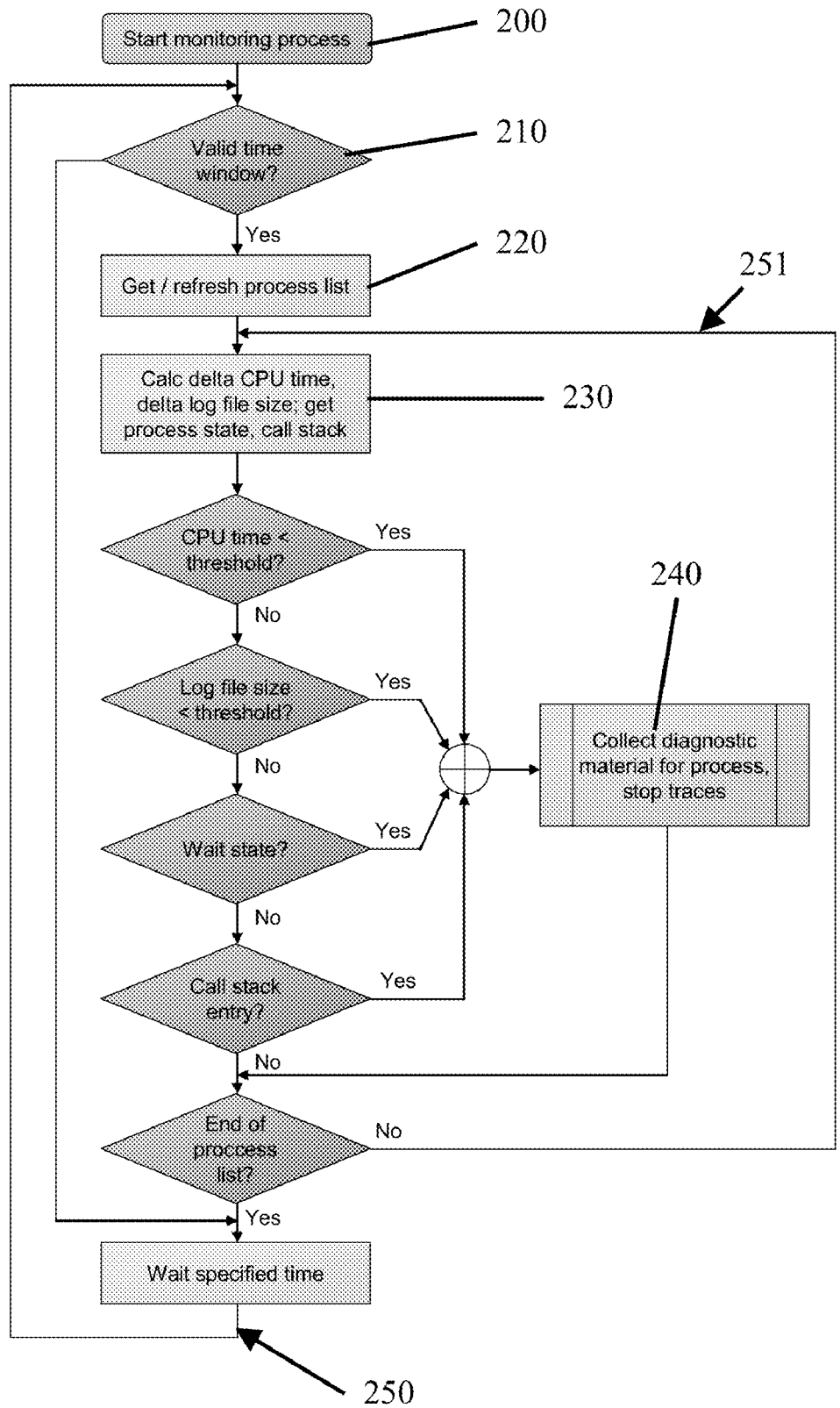

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a schematic illustration of a computing system in accordance with embodiments of the present invention; and FIG. 2 is a flow diagram of a method of operating a computing system in accordance with embodiments of the present invention.

DETAILED DESCRIPTION

With reference to FIGS. 1 and 2, a computing system 10 is provided. The computing system 10 includes a total quantity of computing resources 20, which may include, for example, a central processing unit (CPU) and/or a set of horizontal and vertical processing units, a memory unit 30, which is coupled to the total computing resources 20, and, where the computing system 10 is networked, a networking unit 40, which is also coupled to the total computing resources 20, by which the computing system 10 may be networked with clients 50 and 51. The total computing resources 20 includes first computing resources 21, which represent a fraction of the total quantity of the computing resources 20, and second computing resources 22. The second computing resources 22 represent at least a partial remainder of the total quantity of the computing resources 20 except for the first computing resources 21.

With this construction, the computing system 10 is configured to run multiple processes on at least the first and second computing resources 21 and 22. Such processes could be limited to applications running on only the computing system 10 or may include applications running on clients 50 and 51. In either case, it is possible that the processes may experience lock or wait situations that, for example, cause the applications to temporarily freeze.

The memory unit 30 may include volatile and non-volatile memory, such as random access memory (RAM) and read-only memory (ROM). In this way, the memory unit 30 includes a computer-readable medium having computer-readable executable instructions stored thereon. The executable instructions are accessible to at least the second computing resources 22. When executed, the executable instructions cause the second computing resources 22 to monitor a process running on the first computing resources 21 in accordance with pre-selected parameters, to determine that a potential lock or wait situation that impedes the process is in effect from a result of the monitoring and to execute an action in response to the potential lock or wait situation.

In this way, the executable instructions may be regarded as a tool to perform root cause analysis of temporary process wait situations that can recognize delays in certain processes. This tool can be implemented as a standalone executable program that is controlled by parameters. The program can be executed in a process, which is independent of the process or application that is experiencing the delays. The program runs in a loop by polling status information for one or multiple application processes in predefined intervals. Based on the input of the caller (e.g., a system administrator or consultant), the program detects unusual conditions in the application and performs at least data collection that can help diagnose the problem.

The parameters can be input before the execution of the program and include, but are not limited to, process parameters, interval parameters, time restriction parameters, CPU threshold parameters, log file name parameters, log file growth parameters, process state parameters and call stack entry parameters. Process parameters include process names, user ids or generic information about the processes to be monitored. Interval parameters relate to polling intervals of, e.g., 15 seconds, during which the program polls the process or a list of processes for information that may indicate a potential lock or wait situation. Time restriction parameters relate to restrictions on collection times of, e.g., daily collections between 8:00 am and 7:00 pm. Time restriction type parameters insure that the program does not collect statistics during those times of the day when such statistics would be less valuable, such as midnight when CPU utilization is generally very low and non-representative of normal CPU utilization. CPU threshold parameters establish minimum CPU consumption levels in processes per polling interval to indicate a normal processing state (e.g., 10 milliseconds). Here, a particularly low CPU consumption level across two or more polling intervals would indicate a lock or wait situation. Log file name parameters relate to path names of a log file to monitor for growth, while log file growth parameters relate to minimum amounts of data to be added to log files in intervals to indicate a normal processing state (e.g., 200 bytes). Here, abnormal path names in the log file or substantially reduced growth in the log file across polling intervals would indicate a lock or wait situation. Process state parameters examine process states for indications of a hang situation when seen in two or more subsequent intervals (e.g., lock wait). Finally, call stack entry parameters relate to the identification of certain programs in the call stack that are seen in two or more subsequent intervals.

Thus, the executable instructions, when executed, cause the second computing resources 22 to monitor CPU utilization by the process being run on the first computing resources 21, to monitor a size of a log file of the process, to monitor a process state of the process or to monitor a presence of selected programs or modules in a call stack. Of course, it is understood that the executable instructions can cause the second computing resources to accomplish each of these monitoring options jointly and in various combinations or separately from one another.

Where the second computing resources 22 identify that a result of the monitoring indicates that, e.g., CPU consumption is at low levels or that relatively limited log file growth has occurred for multiple consecutive polling intervals, the second computing resources 22 determine that a potential lock or wait situation is in effect and could act as an impediment to the running of the process. The second computing resources 22 then execute an action in response to the potential lock or wait situation. Such an action may include at least one of a call stack dump, a trace program stop and dump, a collection of statistical information relating to at least the process being monitored, and an execution of a user-written program or script.

In accordance with another aspect of the invention, a computer-readable medium for use in a computing system, including a processing unit, such as the first and second computing resources 21 and 22, is provided and has computer-readable executable instructions stored thereon. The executable instructions, when executed, cause the first or second computing resources 21 or 22 to monitor a running process, which runs on, e.g., the other of the first or second computing resources 21 or 22, to determine that a potential lock or wait situation that impedes the process is in effect from a result of the monitoring and to execute an action in response to the potential lock or wait situation.

In accordance with yet another aspect of the invention and with reference to FIG. 2, a method of operating a computing system, including first and second computing resources representing respective fractions of total computing resources, is provided. The method includes starting a monitoring of processes running on the first computing resources by the second computing resources in accordance with pre-selected parameters (operation 200), confirming that a valid time window (e.g., that the current time is between 8:00 AM and 7:00 PM) for the monitoring is available (operation 210), and updating a list of the processes, including at least one process (operation 220). In an event the valid time window for the monitoring is available, the method further includes detecting a potential lock or wait situation that impedes the running of the at least one process from a result of the monitoring (operation 230), and executing an action in response to the potential lock or wait situation (240).

Here, the monitoring of operation 230 may include at least one of monitoring CPU utilization by the process, monitoring a size of a log file of the process, monitoring a process state of the process, and monitoring a presence of selected programs or modules in a call stack. The executing of operation 240, on the other hand, may include at least one of dumping of a call stack, stopping and dumping a trace program, collecting statistical information relating to at least the process (as shown in FIG. 2), and executing a user-written program or script.

As such, with reference to FIG. 2, the method can be embodied as a tool that is started as a separate process from the process or processes being monitored. It has an outer loop 250 to repeat its activities after waiting for the specified wait time, and an inner loop 251, which processes all processes in the list according to user specifications, such as the parameters discussed hereinabove. For each process, data is kept that can indicate work being done in the process, such as CPU cycles being used since start or the log file size. In addition, data is collected that can indicate a hang situation, such as certain wait states or specific entries in the call stack. If the tool detects an unusual condition, the actions as requested by the caller are initiated.

As an example, a caller could specify that the tool is to monitor all processes running under a specific user id between 8:00 am and 7:00 pm Mondays through Fridays. A process is considered "hanging" if it does not use more than 10 milliseconds (ms) of active CPU resources within a given time interval, and if its log file does not grow by more than 100 bytes within an interval of 15 seconds. These values can be defined based on values observed while the processes run normally. When a process is hanging, a process dump will be obtained to look at the call stack. The tool would first verify that the current date and time are within the specified window, and then collect a list of processes that are running under the specified user id. For each process in the list, the tool is now looking at the CPU cycles used and the log file size. The current values are compared with the ones in the previous interval (unless this is the first run), and if the differences in the values are below the specified threshold, the process dump for this process is initiated. Once processing is completed for all processes in the list, the tool is waiting for the specified time (15 seconds), then the process list is refreshed and the check is starting again.

In accordance with aspects of this invention, analysis of nonspecific performance or wait problems in processes will be eased. While existing watchdog tools always need specific information to recognize a problem, the new method can react on the process not or barely doing any work. This can help to analyze a complete new class of typical problems in complex, productive installations that have been hard to catch in the past.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A computing system, comprising:
   first computing resources representing a fraction of total computing resources;
   second computing resources representing at least a partial remainder of the total computing resources except for the first computing resources; and
   a memory unit, including a computer-readable medium having computer-readable executable instructions stored thereon that are accessible to at least the second computing resources, which, when executed, cause the second computing resources to execute an independent process, which is independent of a process running on the first computing resources, the independent process including:
   confirming that a valid time window for the monitoring is available in an event a current time is within a preselected day time window,
   monitoring the process running on the first computing resources in accordance with pre-selected parameters,
   determining within a given time interval that a potential lock or wait situation that impedes the process is in effect from a result of the monitoring,
   executing an action in response to the potential lock or wait situation, and
   repeating the detecting within the given time interval.

2. The computing system according to claim 1, wherein the independent process comprises monitoring CPU utilization by the process.

3. The computing system according to claim 1, wherein the independent process comprises monitoring a size of a log file of the process.

4. The computing system according to claim 1, wherein the independent process comprises monitoring process state of the process.

5. The computing system according to claim 1, wherein the independent process comprises monitoring a presence of selected programs or modules in a call stack.

6. The computing system according to claim 1, wherein the action comprises a call stack dump.

7. The computing system according to claim 1, wherein the action comprises a trace program stop and dump.

8. The computing system according to claim 1, wherein the action Comprises collection of statistical information relating to at least the process.

9. The computing system according to claim 1, wherein the action comprises an execution of a user-written program or script.

10. A computer-readable medium for use in a computing system, including a processing unit, having computer-readable executable instructions stored thereon, which, when executed cause the processing unit to execute an independent process of:
    confirming that a valid time window for the monitoring is available in an event a current time is within a preselected day time window,
    monitoring the process running on the first computing resources in accordance with preselected paramaters,
    determining within a given time interval that a potential lock or wait situation that impedes the process is in effect from a result of the monitoring,
    executing an action in response to the potential lock or wait situation, and
    repeating the detecting within the given time interval.

11. The computer-readable medium according to claim 10, wherein the independent process comprises monitoring CPU utilization by the process.

12. The computer-readable medium according to claim 10, wherein the independent process comprises monitoring a size of a log file of the process.

13. The computer-readable medium according to claim 10, wherein the independent process comprises monitoring a process state of the process.

14. The computer-readable medium according to claim 10, wherein the independent process comprises monitoring a presence of selected programs or modules in a call stack.

15. The computer-readable medium according to claim 10, wherein the action comprises a call stack dump.

16. The computer-readable medium according to claim 10, wherein the action comprises a trace program stop and dump.

17. The computer-readable medium according to claim 10, wherein the action comprises collection of statistical information relating to at least the process.

18. The computer-readable medium according to claim 10, wherein the action comprises an execution of a user-written program or script.

19. A method of operating a computing system, including first and second computing resources representing respective fractions of total computing resources, the method comprising:

executing an independent process at the second computing resources, which is independent of process running on the first computing resources, the independent process including:

starting a monitoring of the processes running on the first computing resources by the second computing resources in accordance with pre-selected parameters, including a day time window;

in an event a current time is within the day time window, confirming that a valid time window for the monitoring is available;

updating a list of the processes, including at least one process;

in an event the valid time window for the monitoring is available, detecting within a given time interval a potential lock or wait situation that impedes the running of the at least one process from a result of the monitoring;

executing an action in response to the potential lock or wait situation; and repeating the detecting within the given time interval.

20. The method according to claim 19, wherein the monitoring comprises at least one of monitoring CPU utilization by the at least one process, monitoring a size of a log file of the at least one process, monitoring a process state of the at least one process, and monitoring a presence of selected programs or modules in a call stack, and wherein the executing comprises at least one of dumping of a call stack, stopping and dumping a trace program, collecting statistical information relating to at least the at least one process, and executing a user-written program or script.

* * * * *